Jan. 29, 1946.    L. H. DAWSEY ET AL    2,393,891
PRODUCTION OF METAL PEROXIDES
Filed June 8, 1943
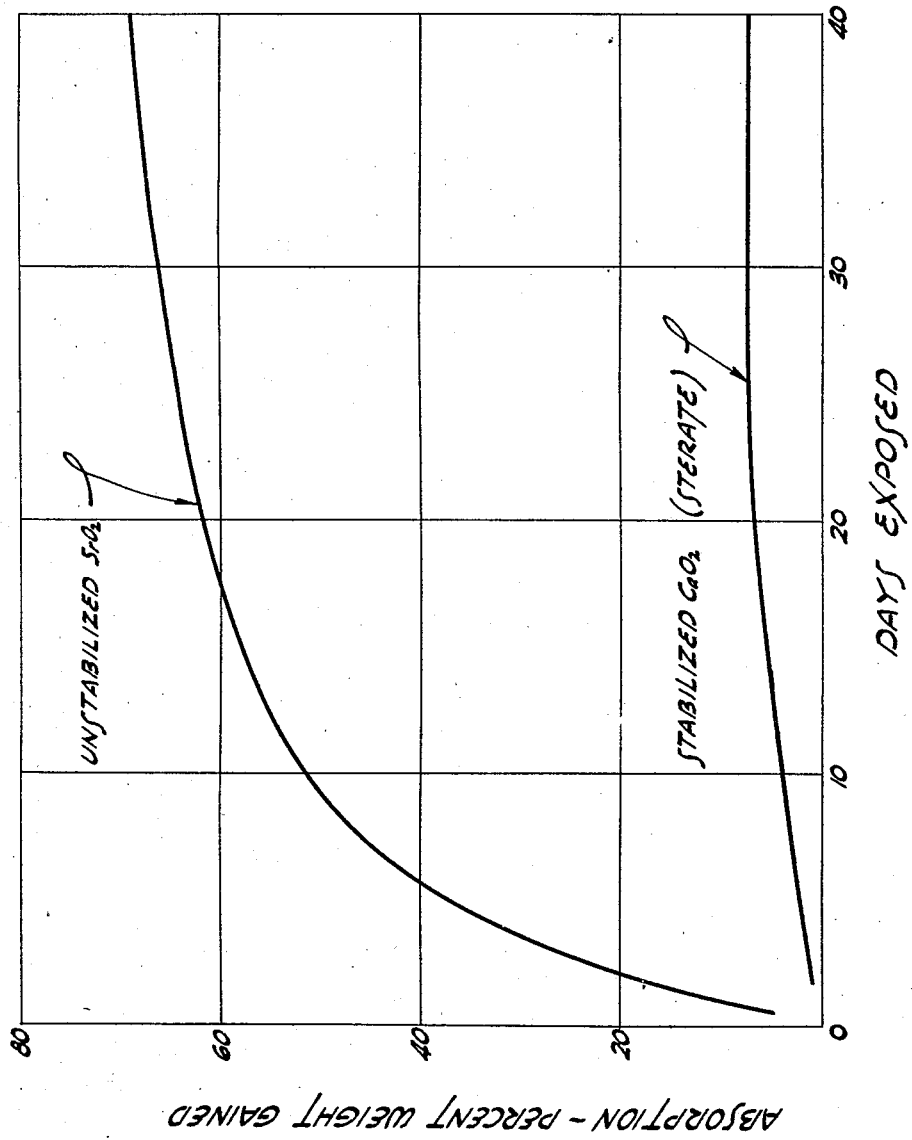
INVENTORS
Lynn H. Dawsey & Hans A. Rudolph
BY
Beau, Brooks, Buckley & Beau.
ATTORNEYS Patented Jan. 29, 1946

2,393,891

UNITED STATES PATENT OFFICE 2,393,891

PRODUCTION OF METAL PEROXIDES

Lynn H. Dawsey, Kenmore, and Hans A. Rudolph, Buffalo, N. Y., assignors to Buffalo Electro-Chemical Company, Inc., Tonawanda, N. Y.

Application June 8, 1943, Serial No. 490,040

3 Claims. (Cl. 23—187)

This invention relates to the stabilization of alkaline earth metal peroxides stabilized against deterioration due to absorption of atmospheric water and carbon dioxide. It is especially applicable in the manufacture of calcium and strontium peroxides.

It is a well-known fact that the anhydrous alkaline earth metal peroxides are hygroscopic, and when exposed to the atmosphere rapidly take up moisture and carbon dioxide with the formation of crystalline peroxide hydrates, hydroxides and carbonates. The absorption of water and carbon dioxide by the alkaline earth metal peroxides is accompanied by deterioration due to loss of active oxygen from the product. Special precautions in handling have been found necessary heretofore to prevent this type of deterioration, such as the use in storage of hermetically sealed metal containers, and the avoidance of prolonged exposure to the air. When the products have been exposed too long, they become worthless for pyrotechnical uses such as in fireworks, flares and other burning compositions due both to the water absorption and the loss of oxygen. When the peroxides are transported on seagoing vessels, or are stored in tropical climates, deterioration, due to the above factors, becomes especially objectionable.

It has been suggested heretofore that water repellents, such as solid magnesium laurate and aluminum stearate be incorporated with the calcium peroxide for the purpose of stabilizing against moisture absorption, but this method has a number of disadvantages. One disadvantage is that the water repellent is dry mixed into the peroxide and is, therefore, ineffective in completely sealing up the surfaces of the metal peroxide particles; another disadvantage is the relatively large quantity of the agent which must be added to the peroxide to become even partly effective. Thus, 50 to 100 parts of magnesium laurate must be mixed with 100 parts of calcium peroxide to obtain only indifferent results. The highest strength calcium peroxide sold commercially heretofore has been 80% $CaO_2$ so that the mixing of the water repellent therewith acts as a diluent reducing the final product to a 40% to 53% $CaO_2$ content, at best. Such a low active oxygen content renders the product, even though stabilized, unfit for many special applications requiring a composition capable of giving off a maximum amount of oxygen. Another objection to this type of stabilized product is that appreciable quantities of organic material have been added to the dry metal peroxides thus constituting a very real combustion hazard. Another disadvantage resides in using stabilizers containing magnesium, aluminum, or zinc, as large proportions of foreign metals are introduced into the product, which are, of course, undesirable when the product is to be utilized in special chemical syntheses involving polymerization reactions and the like. A further disadvantage of the products of the prior art is their tendency to cake or ball up when manipulated rather than remain free flowing.

It is an object of the present invention to overcome the previous disadvantages of the prior art. It is a further object of the invention to produce stabilized alkaline earth metal peroxides in which the amount of stabilizer is only a small percent of the peroxide, thereby producing a stabilized peroxide having an active oxygen content substantially the same as that of the unstabilized product. The product of the present invention having only a small additive material therewith does not possess the fire hazard of previous products having a high content of organic material. As a final advantage, the stabilized product is free flowing even when exposed to air and so may be readily handled and transported.

According to the present invention, an impervious, protective film is formed about each particle of metal peroxide. In a copending application for patent, the desired alkaline earth metal peroxide is precipitated from a solution of a soluble salt of the metal by adding calculated amounts of alkali and hydrogen peroxide or by adding hydrated sodium peroxide, followed by filtration, washing of the wet metal peroxide cake and driving the remaining moisture from the cake at a temperature above 100° C. to give the usual products which are initially dry, free-flowing powders. According to this invention, a stabilized product is formed in the above outlined process during the regular course of manufacture, simply by impregnating the moist metal peroxide cake, before drying, with solutions of certain stabilizing agents. After impregnation, the moist cake is dried in the usual way. The stabilized product obtained resembles the regular product in every way.

The agents applicable in the invention are water soluble fatty acid soaps and the like, water soluble caseinates, soluble silicates, and soluble carbonates, having the property of being able to react with alkaline earth metal peroxides to form water-impervious films. For instance, sodium oleate reacts with calcium peroxide in the presence of moisture to form water-insoluble calcium oleate, and ammonium caseinate reacts with strontium peroxide to form strontium caseinate which, upon drying, produces a water-proofing film. Although the sodium and potassium salts of fatty acids may be employed to advantage, it has been found that ammonium compounds such as ammonium stearate, ammonium caseinate and ammonium carbonate are of special value in practicing the invention, because, during the actual process of film formation ammonia is liberated and driven off leaving no foreign metal salt impurities in the finished product.

In the practice of the invention, the purified, moist, alkaline earth metal peroxide, mentioned above, is treated with an aqueous solution of the stabilizing agent. This operation is best carried out in a centrifuge, in which the cake has previously been collected and washed. The solution containing the soluble agent is simply poured over the cake, at a suitable temperature, with centrifuge running in such a manner as to impregnate the cake uniformly and allow the excess solution to be whirled through the basket. During its passage through the peroxide cake, the soluble stabilizing agent reacts with the solid peroxide particles forming in situ a protective film around each particle which film, upon subsequent drying, hardens into an impervious coating. A single passage of the stabilizer solution through the cake is sufficient to achieve the desired impregnation. In accordance with the invention, it has been found that washing the moist cake with about twice its volume of a 1% solution of stabilizer gives satisfactory results.

The following examples illustrate the methods employed in effecting stabilization of strontium peroxide and calcium peroxide; they are not to be deemed limitative of the invention:

1. *Strontium peroxide.*—Into a centrifuge basket of 350 cc. capacity running at a speed of 3000 R. P. M., containing purified moist strontium peroxide in the shape of an annular cake of inside radius 5.35 cm., outside radius 6.35 cm., and volume of 198 cc., the temperature of strontium peroxide cake being maintained at approximately 60° C., 500 cc. of a 1% solution of ammonium caseinate at 90° C. was poured. The stabilizer solution was allowed to pass through and impregnate the cake, the excess being whirled through the basket. The cake was then removed from the basket and dried at 120° to 130° C., to give a 204 g. yield of stabilized strontium peroxide testing 96.5% $SrO_2$. The product was a slightly yellow, sandy material of an extremely free-flowing nature and of moisture resistant quality.

The curve shown in Figure 1 illustrates, through comparison with unstabilized strontium peroxide prepared in a similar manner, the rate of moisture and carbon dioxide absorption of this caseinate-stabilized product.

2. *Calcium peroxide.*—When the same centrifuge as in Example 1, operating at the same speed, contained purified moist calcium peroxide, in the shape of an annular cake of inner radius 5.85 cm., outer radius 6.35 cm., and volume of 103 cc., the temperature of the cake being maintained at approximately 35° C., and a stabilizer solution of 500 cc. volume containing 1% ammonium stearate at a temperature of 90° C. was used to impregnate the cake, as in Example 1, a dry product was finally obtained, of 115 g. yield, which tested 87.0% $CaO_2$. This material was a yellow powder of a waxy nature which repelled water when placed on the surface.

The graphs of Figure 1 are given to illustrate the effectiveness of the invention in the stabilization of alkaline earth metal peroxides, as applied to calcium peroxide and to strontium peroxide, using two of the agents from the classes of stabilizers already mentioned. The curves were drawn from data taken from actual tests made to determine the comparative amounts of moisture and carbon dioxide absorbed from the air by the stabilized product of Example 1 and of correspondingly prepared unstabilized materials. The results shown represent tests carried out under accelerated weathering conditions, that is, 90% humidity and 40° C., which were more severe than anything likely to be encountered during storage or shipment of the products.

The stability tests were conducted by placing 20 gram samples of the material in circular weighing dishes of 72 mm. diameter and 30 mm. depth so as to distribute the materials in thin layers in order to obtain the maximum possible effect of the atmosphere. The 4 samples were placed in a circulating atmosphere maintained at 40° C. and 90% humidity. The gain in weights due to absorption of moisture and carbon dioxide were recorded from time to time.

In Figure 1, the percent gain in weight of the respective samples, as ordinate, has been plotted against time, in days exposed, as the abscissa. Examination of the curves shows that the stabilized sample had only gained about 7% in 30 days, after which absorption had practically stopped; on the other hand, the unstabilized product had absorbed large quantities of moisture and was continuing to do so at a rapid rate when the tests ended. At the end of the tests the stabilized products remained free-flowing with no apparent change in physical character; whereas, the unstabilized products had changed into hard cakes.

Had these tests been conducted under normal, instead of accelerated weathering conditions, and had the samples been subjected in bulk form to such a normal atmosphere, instead of being spread out in thin layers, the absorption shown by the stabilized materials would have been negligible.

What is claimed is:

1. The process for stabilizing an alkaline earth metal peroxide which comprises impregnating the peroxide, while the latter is in the moist state, with a dilute solution of a water soluble alkaline agent which reacts with the peroxide to form a water insoluble film upon the surface of the peroxide particles.

2. The process for stabilizing an alkaline earth metal peroxide which comprises impregnating the peroxide, while the latter is in the moist state, with a dilute solution of an alkaline caseinate which reacts with the peroxide to form a water insoluble film upon the surface of the peroxide particles.

3. The process for stabilizing an alkaline earth metal peroxide which comprises impregnating the peroxide, while the latter is in the moist state, with a dilute solution of ammonium stearate which reacts with the peroxide to form a water insoluble film upon the surface of the peroxide particles.

LYNN H. DAWSEY.
HANS A. RUDOLPH.